United States Patent
Wilkin et al.

(10) Patent No.: US 8,585,301 B2
(45) Date of Patent: Nov. 19, 2013

(54) SENSOR-MOUNTING BRACKET FOR CAMERA INSTALLATION PROCEDURE

(75) Inventors: George P. Wilkin, Bolingbrook, IL (US); Karl A. Stough, Elburn, IL (US); Dean W. Craig, Aurora, IL (US)

(73) Assignee: Alcatel Lucent, Paris (FR)

( * ) Notice: Subject to any disclaimer, the term of this patent is extended or adjusted under 35 U.S.C. 154(b) by 50 days.

(21) Appl. No.: 13/276,871

(22) Filed: Oct. 19, 2011

(65) Prior Publication Data

US 2013/0101282 A1 Apr. 25, 2013

(51) Int. Cl.
*G03B 17/00* (2006.01)
*G03B 11/00* (2006.01)

(52) U.S. Cl.
USPC .......................................... 396/427; 396/544

(58) Field of Classification Search
USPC .................................. 396/544, 427
See application file for complete search history.

(56) References Cited

U.S. PATENT DOCUMENTS

| | | | |
|---|---|---|---|
| 2,563,389 A * | 8/1951 | Blum ........................ | 248/180.1 |
| 5,598,207 A * | 1/1997 | Kormos et al. ............... | 348/148 |
| 6,895,180 B2 * | 5/2005 | Artonne et al. ................. | 396/71 |
| 6,939,061 B2 * | 9/2005 | Sawada ......................... | 396/427 |
| 6,991,384 B1 * | 1/2006 | Davis ........................... | 396/428 |
| 2003/0128975 A1 * | 7/2003 | Shevick ........................ | 396/428 |
| 2009/0257201 A1 | 10/2009 | Burge | |
| 2010/0110192 A1 | 5/2010 | Johnston et al. | |
| 2010/0254697 A1 * | 10/2010 | Johnson ........................ | 396/428 |

FOREIGN PATENT DOCUMENTS

WO 9965234 A1 12/1999

OTHER PUBLICATIONS

International Search Report for corresponding PCT Application No. PCT/US2012/056998 dated Feb. 20, 2013.

* cited by examiner

*Primary Examiner* — Rodney Fuller
(74) *Attorney, Agent, or Firm* — McCormick, Paulding & Huber, LLP

(57) ABSTRACT

A sensor-mounting bracket for supporting a positioning sensor with respect to a camera so that the compass heading and tilt angle of the camera can be determined. To determine the compass heading and tilt angle of the camera, the sensor-mounting bracket is configured to align the positioning sensor with the sight line of the camera. In particular, the bracket is adapted to align the compass heading and the tilt axis of the positioning sensor so that they are parallel with the sight line of the camera.

22 Claims, 4 Drawing Sheets

SENSOR-MOUNTING BRACKET FOR CAMERA INSTALLATION PROCEDURE

FIELD OF INVENTION

The invention relates to Closed-Circuit Television (CCTV) camera installations.

BACKGROUND OF INVENTION

Certain Closed-Circuit Television (CCTV) installation procedures may require use of a positioning sensor to install a camera at the correct orientation. Correct orientation of the camera is important to ensure that the camera captures the desired view during use. For proper calibration of the positioning sensor in such installation procedures, it may be necessary to position the positioning sensor relative to the camera in a particular manner and to maintain such relative position during the installation process. More particularly, it may be necessary to align the positioning sensor with the camera's line of sight and "zero out" the positioning sensor and camera. Depending on the installation conditions, the process of aligning and "zeroing out" the positioning sensor and camera may be time consuming and difficult to achieve and maintain.

SUMMARY OF INVENTION

In one embodiment, a bracket for supporting a positioning sensor with respect to a camera, comprises: an attachment structure adapted to be secured to the camera; a first support structure adapted to align the positioning sensor with respect to a sight line of the camera, the first support structure defining a first plane for supporting the positioning sensor; and a second support structure adapted to align the positioning sensor with respect to a sight line of the camera, the second support structure defining a second plane for supporting the positioning sensor.

In some embodiments of the above brackets, the second plane is transversely oriented with respect to the first plane, preferably, at an angle of about 95° to about 135°; more preferably, at an angle of about 105° to about 115°; and most preferably, at an angle of about 110°.

In another embodiment, a bracket for supporting a positioning sensor with respect to a camera, comprises: an attachment surface for securing the bracket to the camera; a first planar surface including sensor-locating guides adapted to align the positioning sensor with respect to a sight line of the camera; a second planar surface being transversely oriented with respect to the first planar surface; and a ledge extending transversely from the second planar surface, wherein the ledge is adapted to support the positioning sensor in alignment with the sight line of the camera.

Some embodiments of any of the above brackets further include an alignment guide for aligning the bracket with respect to the camera such that the first support structure and second support structure are properly oriented to align the sensor with the sight line of the camera.

In some embodiments of any of the above brackets, the attachment structure extends from one side of the first support structure and the second support structure extends from an opposite side of the first support structure.

In some embodiments of any of the above brackets, the first support structure is adapted to locate the positioning sensor such that a compass direction of the positioning sensor is parallel with the sight line of camera.

In some embodiments of any of the above brackets, the second support structure is adapted to support the positioning sensor such that a tilt axis of the positioning sensor is parallel with the sight line of the camera.

In some embodiments of any of the above brackets, the sensor-locating guides are aligned perpendicular or parallel with the sight line of the camera.

In some embodiments of any of the above brackets, the sensor-locating guides are adapted to locate the positioning sensor on the first planar surface such that a compass direction of the positioning sensor is parallel with the sight line of camera.

In some embodiments of any of the above brackets, the ledge is adapted to support the positioning sensor such that a tilt axis of the positioning sensor is parallel with the sight line of the camera.

In one embodiment, an assembly for supporting a positioning sensor with respect to a camera, comprises: a bracket, comprising an attachment structure adapted to be secured to the camera; a first support structure adapted to align the positioning sensor with respect to the camera such that a compass direction of the positioning sensor is parallel with a sight line of camera; and a second support structure adapted to align the positioning sensor with respect the camera such that a tilt axis of the positioning sensor is parallel with a sight line of the camera.

Some embodiments of the above assembly further comprise a positioning sensor adapted to be supported by the bracket, or a camera adapted to be connected to the bracket, or both.

In some embodiments of any of the above assemblies, the first support structure defines a first plane for supporting the positioning sensor and the second support structure defines a second plane for supporting the positioning sensor; wherein the first plane and the second plane are transversely oriented with respect to each other, preferably, at an angle of about 95° to about 135°; more preferably, at an angle of about 105° to about 115°; and most preferably, at an angle of about 110°.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific embodiments disclosed. In the drawings.

DETAILED DESCRIPTION OF THE PREFERRED EMBODIMENT

Before the various embodiments are described in further detail, it is to be understood that the invention is not limited to the particular embodiments described. It is also to be understood that the terminology used is for the purpose of describing particular embodiments only, and is not intended to limit the scope of the claims of the present application.

Figure 1:
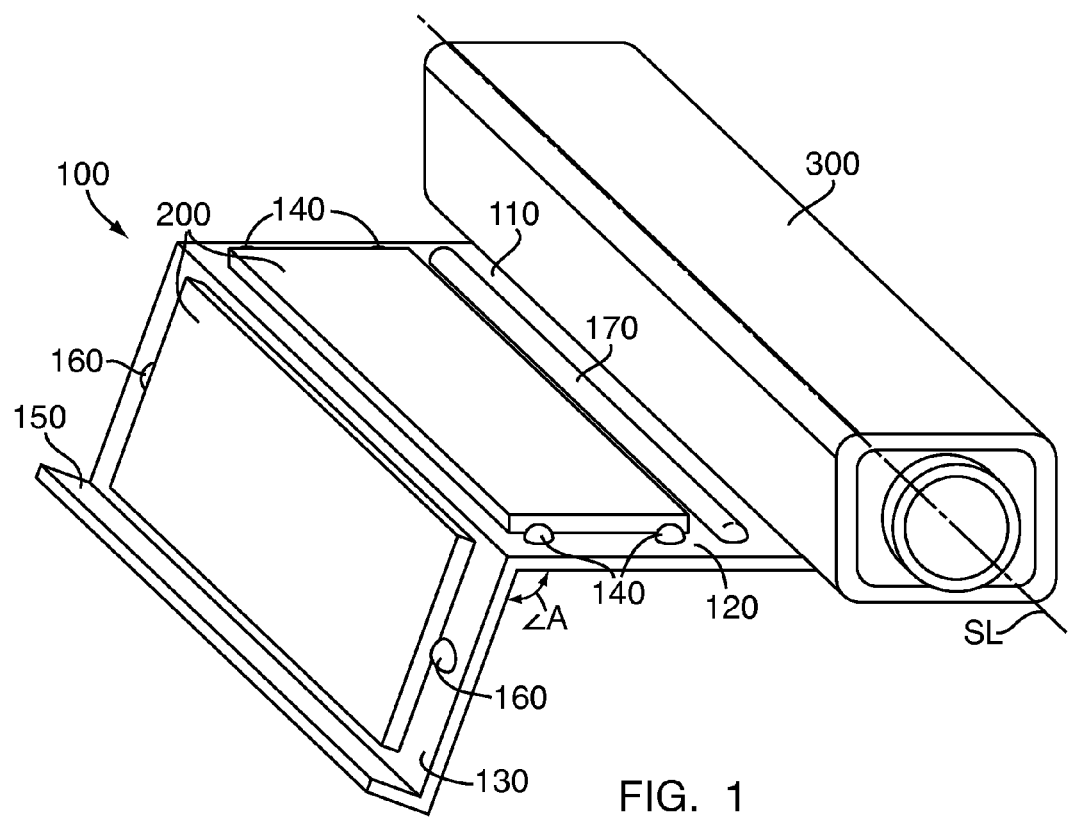
FIG. 1 shows a perspective view of an exemplary bracket attached to a camera and with a positioning sensor placed on a first support structure and a second support structure of the bracket.
Figure 2:
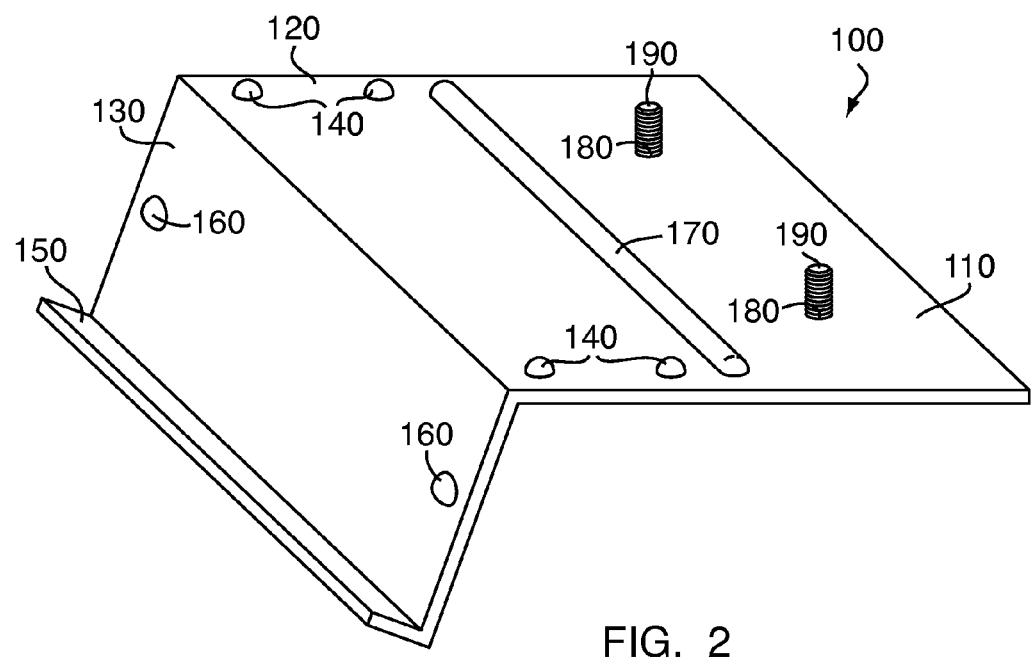
FIG. 2 shows perspective view of the bracket of FIG. 1.
Figure 5:
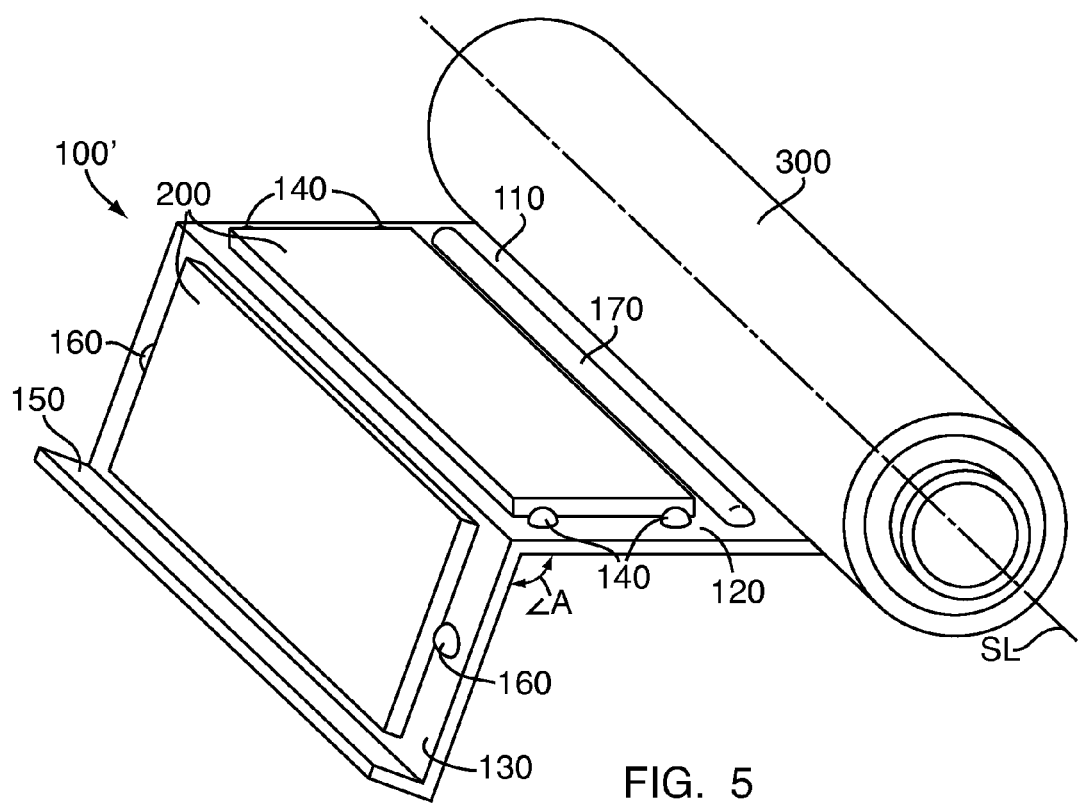
FIG. 5 shows a perspective view of another exemplary bracket attached to camera and with positioning sensor placed on a first support structure and a second support structure of the bracket.

As shown in FIGS. 1 and 5, provided is a sensor-mounting bracket 100 for holding a positioning sensor 200 with respect to a camera 300 so that the compass heading and tilt angle of camera 300 can be determined. Further, bracket 100 is configured to provide a repeatable reference platform for measurements of the compass heading and tilt angle of camera 300. A single positioning sensor or two different positioning sensors may be used to determine the compass heading and the tilt angle of camera 300. Additionally, positioning sensor(s) may be provided in a dedicated piece of hardware or may be integrated in other types of devices. For example, many smartphones now have integrated compass sensors and accelerometers, which allow for accurate determination of the compass heading and tilt angle of the smartphone. Thus, many smartphones can now be used as compass sensors and/or tilt sensors. The following description describes brackets for use with positioning sensors generally, which includes any of the devices described above (e.g., smartphones) or other suitable devices that are capable of providing compass heading and/or tilt angle measurements.

As shown in FIGS. 1 and 5, in order to determine the compass heading and tilt angle of camera 300, sensor-mounting bracket 100 is configured to support and align positioning sensor 200 with the sight line (SL) of camera 300. Generally, as illustrated in the Figures, sensor-mounting bracket 100 comprises attachment structure 110, first support structure 120, and second support structure 130. Attachment structure 110 is adapted to be secured to camera 300. First support structure 120 is adapted to support positioning sensor 200 in a relatively horizontal position to determine a compass heading for the camera. Second support structure 130 is adapted to support positioning sensor 200 in a relatively vertical position to determine a tilt angle for the camera.

In some embodiments, as shown in the Figures, the first and second support structures 120, 130 may be planar surfaces that are transversely oriented with respect to each other, preferably, at an angle (∠A) of about 95° to about 135°; more preferably, at an angle (∠A) of about 105° to about 115°; and most preferably, at an angle (∠A) of about 110°. In other embodiments, however, the first and support structures 120, 130 are not necessarily planar surfaces. The first and second support structures 120, 130 may be configured to support positioning sensor 200 on a first plane and a second plane, respectively, without providing continuous planar surfaces. For example, the first support structure may provide at least three support elements (e.g., pins, posts, pads, brackets, tabs, etc.), which define a first plane. Likewise, the second support structure may provide at least three support elements (e.g., pins, posts, pads, brackets, tabs, etc.), which define a second plane. The first and second planes may be transversely oriented with respect to each other, preferably, at an angle (∠A) of about 95° to about 135°; more preferably, at an angle (∠A) of about 105° to about 115°; and most preferably, at an angle (∠A) of about 110°.

Figure 3A:
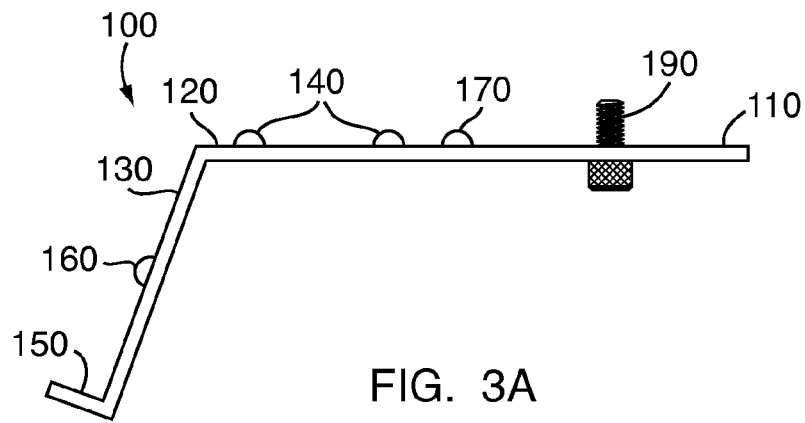
FIG. 3A shows a front view of the bracket of FIG. 1.
Figure 3B:
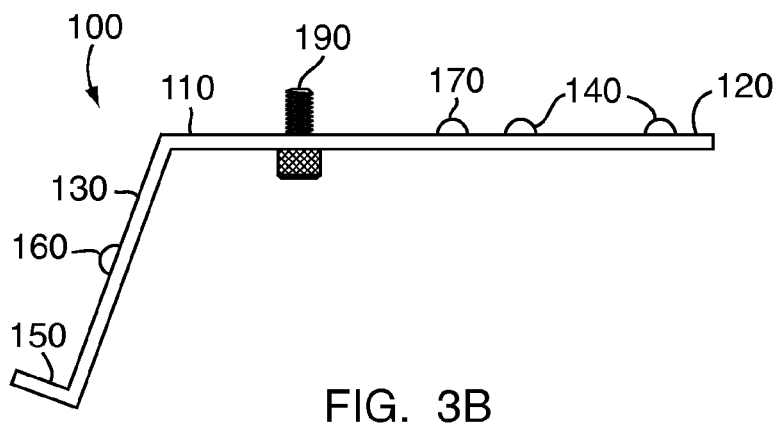
FIG. 3B shows a front view of another exemplary bracket.
Figure 3C:
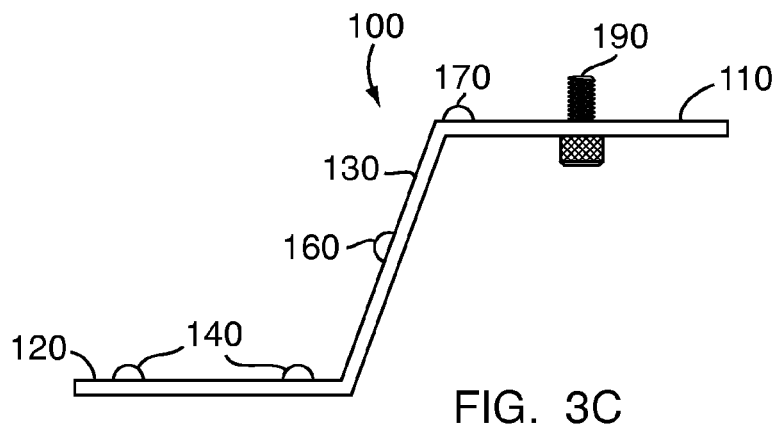
FIG. 3C shows a front view of another exemplary bracket.
Figure 4A:
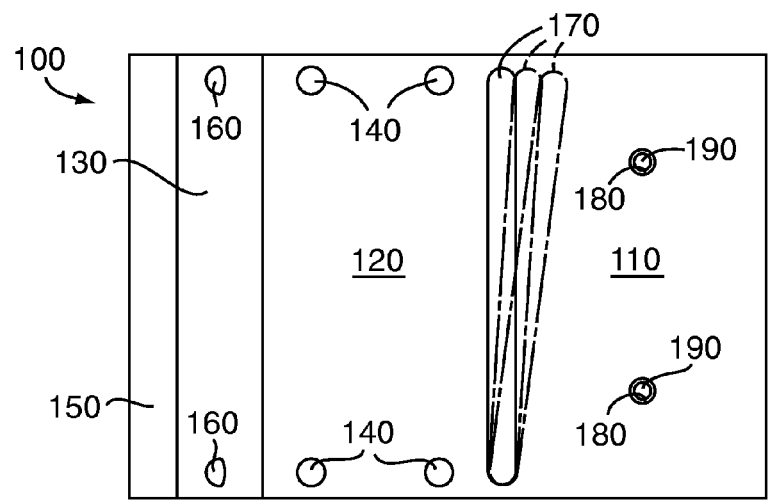
FIG. 4A shows a top view of the bracket of FIG. 1.
Figure 4B:
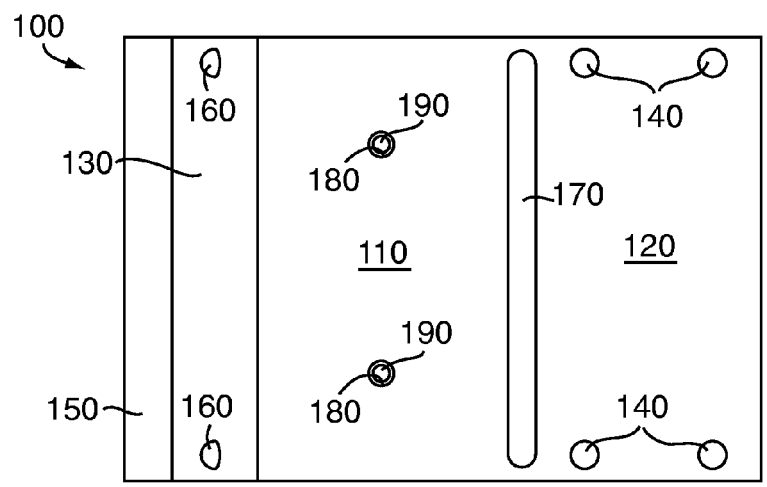
FIG. 4B shows a top view of the bracket of FIG. 3B.
Figure 4C:
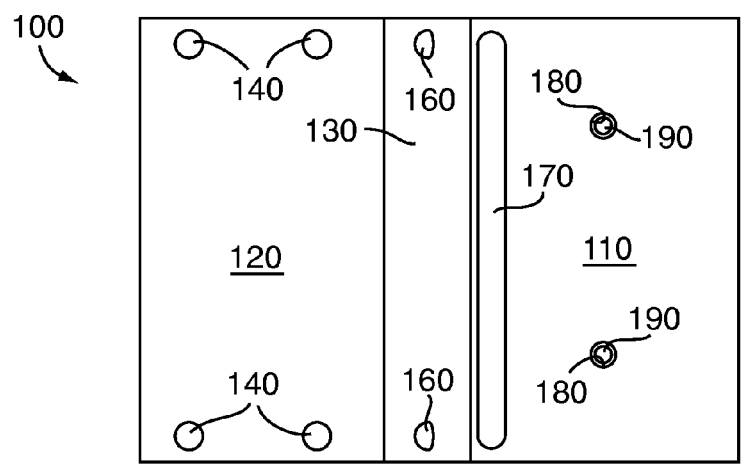
FIG. 4C shows a top view of the bracket of FIG. 3C.

Also, various configurations of bracket 100 are possible. For example, in some embodiments (shown in FIGS. 3A and 4A), first support structure 120 may be disposed between attachment structure 110 and second support structure 130, such that attachment structure 110 extends from one side of first support structure 120 and second support structure 130 extends from an opposite side of first support structure 120. In other embodiments (as shown in FIGS. 3B and 4B), attachment structure 110 may be disposed between first support structure 120 and second support structure 130, such that first support structure 120 extends from one side of attachment structure 110 and second support structure 130 extends from an opposite side of attachment structure 110. In further embodiments (as shown in FIGS. 3C and 4C), second support structure 130 may be disposed between first support structure 120 and attachment structure 110, such that first support structure 120 extends from one side of second support structure 130 and attachment structure 110 extends from an opposite side of second support structure 130.

Sensor-mounting bracket 100 is configured to align positioning sensor 200 with the sight line (SL) of camera 300. Although positioning sensor 200 may be aligned with the sight line (SL) of camera 300 in a collinear relationship, it is not necessarily so. Preferably, as shown in FIGS. 1 and 5, bracket 100 is configured to align positioning sensor 200 with the sight line (SL) of camera 300 in a parallel relationship.

More particularly, first support structure 120 of bracket 100 is adapted to support positioning sensor 200 such that its compass heading is aligned (i.e., parallel) with the sight line (SL) of camera 300. In some embodiments, as shown in the Figures, sensor-locating guides 140 may be provided on first support structure 120 of bracket 100 for locating positioning sensor 200 and aligning its compass heading with the sight line (SL) of camera 300. Sensor-locating guides 140 are arranged and configured so that when positioning sensor 200 is aligned with sensor-locating guides 140, the compass heading of positioning sensor 200 and the sight line (SL) of camera 300 are also aligned.

In some embodiments, as shown in the Figures, sensor-locating guides 140 may be bumpers disposed on first support structure 120 of the bracket. Sensor-locating guides 140, however, are not limited to bumpers and can be other structures suitable for locating positioning sensor 200, such as ribs or pins protruding from first support structure 120, or lines marked on first support structure 120. Sensor-locating guides 140 may be integrally formed with first support structure 120 of the bracket or they may be applied to the surface. For example, sensor-locating guides 140 may be rubber bumpers or silicone ribs applied to first support structure 120.

Second support structure 130 of bracket 100 is configured to support positioning sensor 200 such that its tilt axis is aligned (i.e., parallel) with the sight line (SL) of camera 300. In some embodiments, as shown in the Figures, ledge 150 may be provided extending transversely from second support structure 130, where ledge 150 defines a plane parallel to sight line (SL) of camera 300. Thus, second support structure 130 and ledge 150 of bracket 100 are adapted to support positioning sensor 200 such that its tilt axis is aligned (i.e., parallel) with the sight line (SL) of camera 300. In some embodiments, as shown in the Figures, second support structure 130 may also include retaining members 160 for maintaining positioning sensor 200 on second support structure 130 when bracket 100 is tilted.

In some embodiments, as shown in the Figures, retaining members 160 may be bumpers disposed on second support structure 130 of the bracket. The retaining members, however, are not limited to bumpers and can be other structures suitable for maintaining positioning sensor 200 on second support structure 130 when the bracket is tilted, such as ribs or pins protruding from second support structure 130. Retaining members 160 may be integrally formed with second support structure 130 or they may be applied to a planar surface of second support structure 130. For example, retaining members 160 may be rubber bumpers or silicone ribs applied to second support structure 130.

In order for positioning sensor 200 to be properly aligned with the sight line (SL) of camera 300 when it is placed on bracket 100, it is important to secure bracket 100 to the housing of camera 300 in the correct orientation. To that end, bracket 100 may be configured differently for use with different types of camera housings. For example, in the embodiment shown in FIG. 1-4, attachment structure 110 of bracket 100 may be planar for use with a box-type camera housing that has flat surfaces. In another embodiment shown in FIGS. 5-6, attachment structure 110 may be semi-cylindrical for use with cylindrical camera housing.

Additionally, as shown in FIGS. 1-4, in some embodiments, alignment guide 170 may be provided on either attachment structure 110 or first support structure 120 of bracket 100 for confirming the proper orientation of bracket 100 with respect to the housing of camera 300 when bracket 100 is secured to the housing of camera 300. As shown in FIGS. 1 and 5, alignment guide 170 is arranged so that when alignment guide 170 is aligned with the housing of camera 300, sensor-locating guides 140 are properly oriented (i.e., parallel and/or perpendicular to the sight line (SL) of camera 300) to align positioning sensor 200 with the sight line (SL) of camera 300. Different embodiments of bracket 100 adapted for use with different camera 300 housings, may require different arrangement of alignment guide 170 on either attachment structure 110 or first support structure 120. For example, as shown in FIG. 4A, camera 300 housings having tapered shapes may require varying degrees of adjustment of alignment guide 170 so that when alignment guide 170 is aligned with the housing of camera 300, sensor-locating guides 140 are properly oriented to align positioning sensor 200 with the sight line (SL) of camera 300.

Different means for securing bracket 100 to the housing of camera 300 may be provided. In some embodiments, as shown in the Figures, fasteners 190 may be retained in mounting holes 180 that are disposed on attachment structure 110 of bracket 100. Fasteners 190 and mounting holes 180 may be arranged to match the configuration of existing tapped holes in the housing of camera 300 so that bracket 100 can be secured to the housing of camera 300 with fasteners 190. Further, fasteners 190 and mounting holes 180 may be arranged so that when bracket 100 is secured to the housing of camera 300, sensor-locating guides 140 are properly oriented to align positioning sensor 200 with the sight line (SL) of camera 300. In other embodiments, bracket 100 may be secured to the housing of camera 300 by placing attachment structure 110 of bracket 100 on the housing of camera 300 and clamping it to the housing of camera 300 with a conventional clamp (e.g., bar clamp). In further embodiments, bracket 100 may be secured to the housing of camera 300 by placing attachment structure 110 of bracket 100 on the housing of camera 300 and securing it to the housing of camera 300 with a hook and loop strap.

Bracket 100 is preferably made of a non-ferrous material (e.g., plastic, Plexiglas®) to reduce interference with positioning sensor 200, which may adversely affect the compass heading and tilt angle measurements. Additionally, bracket 100 preferably has a one-piece construction, which may be molded as one piece or may be bent from a single sheet.

Bracket 100 will now be described with reference to particular embodiments adapted for use with a box-type camera housing, as illustrated in FIGS. 1-4C. Bracket 100 comprises attachment structure 110, first support structure 120, and second support structure 130. Bracket 100 is configured to align positioning sensor 200 with the sight line (SL) of camera 300. Preferably, as shown in FIG. 1, bracket 100 is configured to align positioning sensor 200 with the sight line (SL) of camera 300 in a parallel relationship. By aligning positioning sensor 200 with respect to the sight line (SL) of camera 300, the compass heading and tilt angle of the sight line (SL) of camera 300 can be determined.

As shown in FIG. 1, in some embodiments, bracket 100 may be adapted to be secured to the bottom of the housing of camera 300. When using bracket 100 with a camera having a box-type housing, attachment structure 110 may comprise a planar surface so that it can be attached to a flat area of the bottom of the housing of camera 300 that is parallel to the vanishing line of camera 300. Additionally, as shown in FIGS. 1-4, in some embodiments, alignment guide 170 may be provided on either attachment structure 110 or first support structure 120 of bracket 100 for confirming the proper orientation of bracket 100 with respect to the housing of camera 300 when bracket 100 is secured to the housing of camera 300. As shown in FIGS. 1 and 5, alignment guide 170 is arranged so that when alignment guide 170 is aligned with the housing of camera 300, sensor-locating guides 140 are properly oriented (i.e., parallel and/or perpendicular to the sight line (SL) of camera 300) to align positioning sensor 200 with the sight line (SL) of camera 300. Different embodiments of bracket 100 adapted for use with different camera 300 housings, may require different arrangement of alignment guide 170 on either attachment structure 110 or first support structure 120. For example, as shown in FIG. 4A, camera 300 housings having tapered shapes may require varying degrees of adjustment of alignment guide 170 so that when alignment guide 170 is aligned with the housing of camera 300, sensor-locating guides 140 are properly oriented to align positioning sensor 200 with the sight line (SL) of camera 300.

Different means for securing bracket 100 to the housing of camera 300 may be provided. For example, as shown in FIGS. 1-4C, fasteners 190 may be retained in mounting holes 180 disposed on attachment structure 110 of bracket 100. Fasteners 190 and mounting holes 180 may be arranged to match the configuration of existing tapped holes in the housing of camera 300 so that bracket 100 can be secured to the housing of camera 300 with fasteners 190. Further, fasteners 190 and mounting holes 180 may be arranged so that when bracket 100 is secured to the housing of camera 300, sensor-locating guides 140 are properly oriented to align positioning sensor 200 with the sight line (SL) of camera 300.

In some embodiments, as shown in FIGS. 1-4C, first support structure 120 is preferably a planar surface that extends from attachment structure 110 to support positioning sensor 200 in a relatively horizontal position to determine a compass heading of camera 300. As shown in FIGS. 1-3C, in some embodiments, first support structure 120 is preferably coplanar with the planar surface of attachment structure 110, but in other embodiments (not shown), first support structure 120 and attachment structure 110 may be offset and parallel. First support structure 120 of bracket 100 is adapted to support positioning sensor 200 such that its compass heading is aligned (i.e., parallel) with the sight line (SL) of camera 300. In some embodiments, as shown in FIGS. 1-4C, sensor-locating guides 140 may be provided on first support structure 120 of bracket 100 for locating positioning sensor 200 and aligning its compass heading with the sight line (SL) of camera 300. Sensor-locating guides 140 are arranged and configured so that when positioning sensor 200 is aligned with sensor-locating guides 140, the compass heading of positioning sensor 200 and the sight line (SL) of camera 300 are also aligned. For example, as shown in FIGS. 1-4C, sensor-locating guides 140 may be arranged so that when bracket 100 is attached to camera 300, sensor-locating guides 140 are disposed perpendicular or parallel to the sight line (SL) of camera 300, or both. Thus, when positioning sensor 200 is aligned with sensor-locating guides 140, the compass heading of positioning sensor 200 and the sight line (SL) of camera 300 are also aligned.

As shown in FIGS. 1-4C, sensor-locating guides 140 may be bumpers disposed on first support structure 120 of the bracket. Sensor-locating guides 140, however, are not limited to bumpers and can be other structures suitable for locating positioning sensor 200, such as ribs or pins protruding from first support structure 120, or lines marked on first support structure 120. Sensor-locating guides 140 may be integrally formed with first support structure 120 of the bracket or they may be applied to the planar surface of first support structure 120. For example, sensor-locating guides 140 may be rubber bumpers or silicone ribs applied to first support structure 120.

Second support structure 130 is adapted to support positioning sensor 200 in a relatively vertical position to determine a tilt angle of camera 300. Second support structure 130 of bracket 100 is configured to support positioning sensor 200 such that its tilt axis is aligned (i.e., parallel) with the sight line (SL) of camera 300. As shown in FIGS. 1-4C, ledge 150 may be provided extending transversely from second support structure 130, where ledge 150 defines a plane parallel to sight line (SL) of camera 300. Thus, second support structure 130 and ledge of bracket 100 are adapted to support positioning sensor 200 such that its tilt axis is aligned (i.e., parallel) with the sight line (SL) of camera 300. As shown in FIGS. 1-4C, second support structure 130 may also include retaining members 160 for maintaining positioning sensor 200 on second support structure 130 when bracket 100 is tilted.

As shown in FIGS. 1-4C, retaining members 160 may be bumpers disposed on second support structure 130 of bracket 100. Retaining members 160, however, are not limited to bumpers and can be other structures suitable for maintaining positioning sensor 200 on second support structure 130 when the bracket is tilted, such as ribs or pins protruding from second support structure 130. Retaining members 160 may be integrally formed with second support structure 130 or they may be applied to a planar surface of second support structure 130. For example, retaining members 160 may be rubber bumpers or silicone ribs applied to second support structure 130.

In some embodiments, as shown in the FIGS. 1-4C, the first and second support structures 120, 130 may be planar surfaces that are transversely oriented with respect to each other, preferably, at an angle (∠A) of about 95° to about 135°; more preferably, at an angle (∠A) of about 105° to about 115°; and most preferably, at an angle (∠A) of about 110°. In other embodiments, however, the first and support structures 120, 130 are not necessarily planar surfaces. The first and second support structures 120, 130 may be configured to support positioning sensor 200 on a first plane and a second plane, respectively, without providing continuous planar surfaces. For example, the first support structure may provide at least three support elements (e.g., pins, posts, pads, brackets, tabs, etc.), which define a first plane. Likewise, the second support structure may provide at least three support elements (e.g., pins, posts, pads, brackets, tabs, etc.), which define a second plane. The first and second planes may be transversely oriented with respect to each other, preferably, at an angle (∠A) of about 95° to about 135°; more preferably, at an angle (∠A) of about 105° to about 115°; and most preferably, at an angle (∠A) of about 110°.

As shown in FIGS. 3A-4C, various configurations of bracket 100 are possible. For example, in some embodiments (shown in FIG. 3A), first support structure 120 may be disposed between attachment structure 110 and second support structure 130, such that attachment structure 110 extends from one side of first support structure 120 and second support structure 130 extends from an opposite side of first support structure 120. In other embodiments (as shown in FIG. 3B), attachment structure 110 may be disposed between first support structure 120 and second support structure 130, such that first support structure 120 extends from one side of attachment structure 110 and second support structure 130 extends from an opposite side of attachment structure 110. In further embodiments (as shown in FIG. 3C), second support structure 130 may be disposed between first support structure 120 and attachment structure 110, such that first support structure 120 extends from one side of second support structure 130 and attachment structure 110 extends from an opposite side of second support structure 130.

Figure 6:
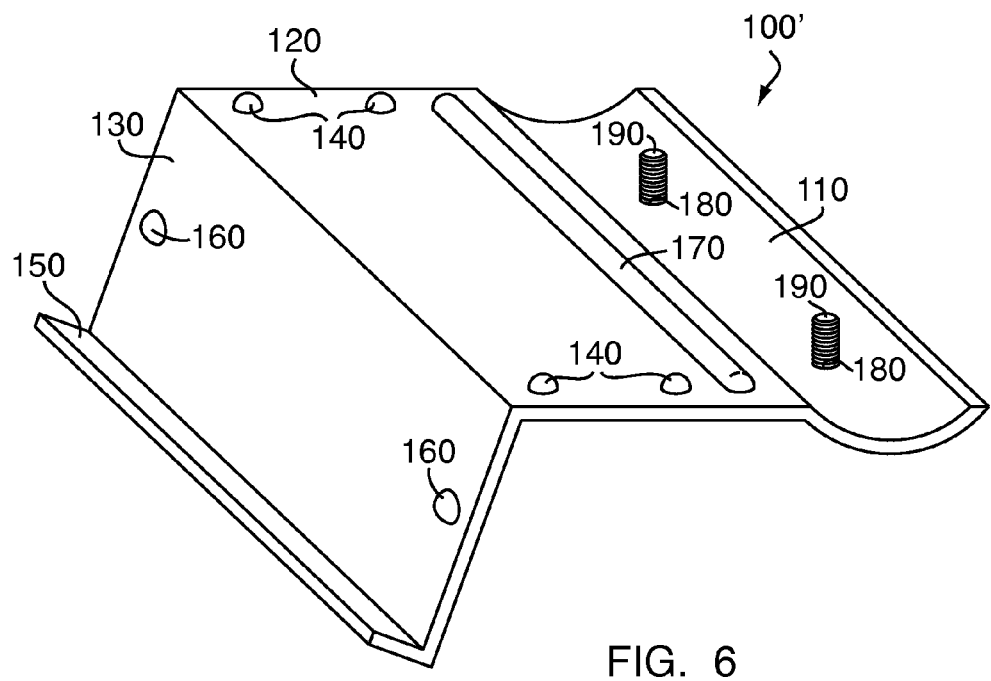
FIG. 6 shows a perspective view of the bracket of FIG. 5.

Also, in some embodiments, bracket 100' is adapted for use with a cylindrical camera housing, as illustrated in FIGS. 5 and 6. Bracket 100' shown in FIGS. 5 and 6 is substantially similar to bracket 100 shown in FIGS. 1, 2, 3A and 4A, except bracket 100' comprises attachment structure 110', which is semi-cylindrical, and bracket 100 comprises attachment structure 110, which is planar. Accordingly, the above description for bracket 100 is equally applicable to the embodiment of bracket 100' and many of the features described with respect to bracket 100 can be incorporated in bracket 100', as shown in FIGS. 5 and 6. In some embodiments, as shown in FIGS. 5 and 6, bracket 100' may comprise attachment structure 110', which has a semi-cylindrical to match the outer contour of a cylindrical housing of camera 300. In other embodiments (not shown), the semi-cylindrical shape of attachment structure 110' may be tapered toward one end to match the outer contour of a truncated conical housing of camera 300.

Additionally, as shown in FIGS. 5 and 6, in some embodiments, alignment guide 170 may be provided on either attachment structure 110' or first support structure 120 of bracket 100' for confirming the proper orientation of bracket 100' with respect to the housing of camera 300 when bracket 100' is secured to the housing of camera 300. As shown in FIGS. 5 and 6, alignment guide 170 is arranged so that when alignment guide 170 is aligned with the housing of camera 300, sensor-locating guides 140 are properly oriented (i.e., parallel and/or perpendicular to the sight line (SL) of camera 300) to align positioning sensor 200 with the sight line (SL) of camera 300.

Different means for securing bracket 100' to the housing of camera 300 may be provided. For example, as shown in FIG. 6, fasteners 190 may be retained in mounting holes 180 that are disposed on attachment structure 110' of bracket 100'. Fasteners 190 and mounting holes 180 may be arranged to match the configuration of existing tapped holes in the housing of camera 300 so that bracket 100' can be secured to the housing of camera 300 with fasteners 190. Further, fasteners 190 and mounting holes 180 may be arranged so that when bracket 100' is secured to the housing of camera 300, sensor-locating guides 140 are properly oriented to align positioning sensor 200 with the sight line (SL) of camera 300.

While various embodiments have been described, it will be appreciated by those of ordinary skill in the art that modifications can be made to the various embodiments without departing from the spirit and scope of the invention as a whole.

What is claimed is:

1. A bracket for supporting a positioning sensor with respect to a camera, comprising:
   an attachment structure adapted to be secured to the camera;

a first support structure adapted to align the positioning sensor with respect to a sight line of the camera, the first support structure defining a first plane for supporting the positioning sensor; and a second support structure adapted to align the positioning sensor with respect to a sight line of the camera, the second support structure defining a second plane for supporting the positioning sensor;

wherein the second plane is transversely oriented with respect to the first plane at an angle of about 95° to about 135°.

2. The bracket according to claim 1, wherein the second plane is transversely oriented with respect to the first plane at an angle of about 105° to about 115°.

3. The bracket according to claim 1, wherein the second plane is transversely oriented with respect to the first plane at an angle of about 110°.

4. The bracket according to claim 1, further including an alignment guide for aligning the bracket with respect to the camera such that the first support structure and second support structure are properly oriented to align the sensor with the sight line of the camera.

5. The bracket according to claim 1, wherein the attachment structure extends from one side of the first support structure and the second support structure extends from an opposite side of the first support structure.

6. The bracket according to claim 1, wherein the first support structure is adapted to locate the positioning sensor such that a compass direction of the positioning sensor is parallel with the sight line of camera.

7. The bracket according to claim 1, wherein the second support structure is adapted to support the positioning sensor such that a tilt axis of the positioning sensor is parallel with the sight line of the camera.

8. A bracket for supporting a positioning sensor with respect to a camera, comprising:
an attachment surface for securing the bracket to the camera;
a first planar surface including sensor-locating guides adapted to align the positioning sensor with respect to a sight line of the camera;
a second planar surface being transversely oriented with respect to the first planar surface; and
a ledge extending transversely from the second planar surface, wherein the ledge is adapted to support the positioning sensor in alignment with the sight line of the camera.

9. The bracket according to claim 8, further including an alignment guide for aligning the bracket with respect to the camera such that the sensor-locating guides are properly oriented to align the sensor with the sight line of the camera.

10. The bracket according to claim 9, wherein the sensor-locating guides are aligned perpendicular or parallel with the sight line of the camera.

11. The bracket according to claim 8, wherein the attachment surface extends from one side of the first planar surface and the second surface extends from an opposite side of the first planar surface.

12. The bracket according to claim 8, wherein the sensor-locating guides are adapted to locate the positioning sensor on the first planar surface such that a compass direction of the positioning sensor is parallel with the sight line of camera.

13. The bracket according to claim 8, wherein the ledge is adapted to support the positioning sensor such that a tilt axis of the positioning sensor is parallel with the sight line of the camera.

14. An assembly for supporting a positioning sensor with respect to a camera, comprising:
a bracket, comprising:
an attachment structure adapted to be secured to the camera;
a first support structure adapted to align the positioning sensor with respect to the camera such that a compass direction of the positioning sensor is parallel with a sight line of camera; and
a second support structure adapted to align the positioning sensor with respect the camera such that a tilt axis of the positioning sensor is parallel with a sight line of the camera;
wherein the first support structure defines a first plane for supporting the positioning sensor and the second support structure defines a second plane for supporting the positioning sensor; and wherein the first plane and the second plane are transversely oriented with respect to each other at an angle of about 95° to about 135°.

15. The assembly according to claim 14, further comprising a positioning sensor adapted to be supported on the first support structure or the second support structure of the bracket.

16. The assembly according to claim 15, further comprising a camera adapted to be connected to the attachment structure of the bracket.

17. The assembly according to claim 14, further comprising a camera adapted to be connected to the attachment structure of the bracket.

18. The assembly according to claim 15, wherein the second plane is transversely oriented with respect to the first plane at an angle of about 105° to about 115°.

19. The assembly according to claim 15, wherein the second plane is transversely oriented with respect to the first plane at an angle of about 110°.

20. An assembly for supporting a positioning sensor with respect to a camera, comprising:
a bracket comprising:
an attachment structure adapted to be secured to the camera;
a first support structure adapted to align the positioning sensor with respect to a sight line of the camera, the first support structure defining a first plane for supporting the positioning sensor; and
a second support structure adapted to align the positioning sensor with respect to a sight line of the camera, the second support structure defining a second plane for supporting the positioning sensor;
wherein the first plane and the second plane are transversely oriented with respect to each other at an angle of about 95° to about 135°; and
a camera adapted to be connected to the attachment structure of the bracket.

21. An assembly for supporting a positioning sensor with respect to a camera, comprising:
a bracket comprising:
an attachment structure adapted to be secured to the camera;
a first support structure adapted to align the positioning sensor with respect to a sight line of the camera, the first support structure defining a first plane for supporting the positioning sensor; and
a second support structure adapted to align the positioning sensor with respect to a sight line of the camera, the second support structure defining a second plane for supporting the positioning sensor;

wherein the first plane and the second plane are transversely oriented with respect to each other at an angle of about 95° to about 135°; and a positioning sensor adapted to be supported on the first support structure or the second support structure of the bracket.

22. An assembly for supporting a positioning sensor with respect to a camera, comprising:

a bracket comprising:

an attachment structure adapted to be secured to the camera;

a first support structure adapted to align the positioning sensor with respect to a sight line of the camera, the first support structure defining a first plane for supporting the positioning sensor; and a second support structure adapted to align the positioning sensor with respect to a sight line of the camera, the second support structure defining a second plane for supporting the positioning sensor;

wherein the first plane and the second plane are transversely oriented with respect to each other at an angle of about 95° to about 135°;

a camera adapted to be connected to the attachment structure of the bracket; and a positioning sensor adapted to be supported on the first support structure or the second support structure of the bracket.

* * * * *